Patented Dec. 1, 1953

2,661,349

UNITED STATES PATENT OFFICE 2,661,349

POLYSACCHARIDE DERIVATIVES OF SUBSTITUTED DICARBOXYLIC ACIDS

Carlyle G. Caldwell, Forest Hills, and Otto B. Wurzburg, Babylon, N. Y., assignors to National Starch Products Inc., New York, N. Y., a corporation of Delaware No Drawing. Application February 18, 1949, Serial No. 77,296

3 Claims. (Cl. 260—224)

Our invention relates to new derivatives of polysaccharides. More particularly, it is our object to produce derivatives of starch, characterized by greatly improved qualities as emulsifying agents, thickeners, sizes, and other commercial applications.

It is generally recognized that an emulsifying chemical is one which commonly contains within its structure both a hydrophobic and a hydrophilic radical. It is, therefore, our further object to devise a commercially economical process whereby a hydrophilic group as well as a hydrophobic group may be introduced into a polysaccharide molecule, and, specifically, it is our object to produce a substituted polysaccharide wherein each substituent radical contains both a hydrophilic and a hydrophobic group.

Ordinary surface-active agents—as, for example, soaps—which are effective as emulsifiers, are characterized by having in each molecule both a hydrophilic group and a hydrophobic group. These molecules, when dispersed in an agitated oil and water mixture, are believed to orient themselves more or less perpendicularly to the interface of the water and oil droplets, the hydrophobic portion being in the oil phase and the hydrophilic portion being in the water phase, with the result that a monomolecular film of the emulsifier molecules is formed about each droplet. These films have very low cohesive forces and the molecules in them are held in place primarily because of the forces exerted by the oil and water phases. They are easily disrupted, with the result that oil droplets may be caused to coalesce to form larger aggregates, and continuation of this process may eventually result in a separation of the emulsion into two phases.

On the other hand, polysaccharides such as starch or cellulose are high molecular-weight film-forming materials. Such products, when treated so that their molecules contain hydrophobic as well as hydrophilic groups, likewise tend to be attracted to the interface of water and oil droplets in an emulsion. However, since these molecules are linear, or appreciably so, and the hydrophilic and hydrophobic groups are distributed along the linear polymeric molecules, orientation of these linear molecules must be more or less parallel to the interface to allow the hydrophobic groups to extend into the oil phase and the hydrophilic groups to extend into the water phase. As a result, a tougher, more cohesive, more continuous, and less easily ruptured film is formed about the oil droplets, and it is more difficult for them to come together and coalesce. It follows, therefore, that such a polysaccharide derivative tends to give more stable and permanent emulsions.

In copending application, Serial No. 4,947, filed January 28, 1948, there is described a method for forming mixed ethers of polysaccharides wherein one ether linkage introduces a hydrophilic group and the other ether linkage introduces a hydrophobic group. Although such products are good emulsifying agents, for the reasons explained above, their manufacture involves a rather complex procedure, including the use of at least two separate etherifying reagents (one to introduce the hydrophilic group and one to introduce the hydrophobic group).

We have now discovered that products which are even better for many purposes, can be produced more simply and economically. Our invention comprises the treatment of a polysaccharide with a single reagent which introduces both a hydrophilic and a hydrophobic group, so that each substituent radical of the resultant substituted polysaccharide contains both a hydrophilic as well as a hydrophobic group. By the previous method, described above, one substituent radical could contain a hydrophilic group and another could contain a hydrophobic group, but no one substituent radical could contain both.

The product of our invention is valuable for many industrial purposes, particularly because of its ability to form more stable and permanent emulsions. It is believed that this improvement results from the fact that both the hydrophilic and hydrophobic functions, in the product of our invention, are present in each substituent group and, thus, more uniformly balance each other. On the other hand, in the above-mentioned mixed ether derivatives, there is probably a more heterogeneous distribution of hydrophilic and hydrophobic groups; i. e., some portions of the polymeric chain contain a relatively high ratio of hydrophilic to hydrophobic groups, while other portions of the chain contain the reverse ratio. For the manufacture of our product, it is not necessary to use more than one reagent, this one reagent introducing both a hydrophilic and a hydrophobic group. The economy involved in eliminating the use of at least one major reagent (that is, as compared to the minimum of two reagents required by the process of the copending application), is self-evident.

In the term "polysaccharide" we mean to include starch, gelatinized or ungelatinized, from any source, including corn, tapioca, potato, wheat, sago, rice, waxy maize, and the other known types; also modified or thin-boiling starches and starch erivatives; also dextrins; also cellulose (such as wood pulp, cotton linters, regenerated cellulose), and hemi-cellulose, in the form of their water-soluble derivatives.

According to our method, a polysaccharide is treated with a substituted cyclic dicarboxylic acid anhydride (hereafter sometimes called the "reagent") of the following structural formula:

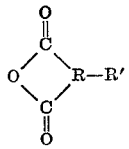

Wherein R represents a dimethylene or trimethylene radical and wherein R' is the substituent group, which is a hydrophobic group (ordinarily long chain hydrocarbon radical). Substituted cyclic dicarboxylic acid anhydrides falling within the above structural formula are the substituted succinic and glutaric acid anhydrides.

The hydrophobic substituent group R' may be alkyl, alkenyl, aralkyl, or aralkenyl, and should contain from 5 to 18 carbon atoms. R' may be joined to the anhydride moiety R through a carbon-to-carbon bond (as in alkenyl succinic anhydride) or through two carbon-to-carbon bonds as in the adduct of maleic anhydride with methyl pentadiene, or as in the cyclo-paraffinic cyclo-dicarboxylic acid anhydrides, such as, for example, cyclo hexane 1,2-dicarboxylic acid anhydride, or may be linked through an ether or ester linkage (as, for example, in octyloxy succinic anhydride or in capryloxy succinic anhydride). Regardless of the particular linkage between the hydrophobic substituent R' and the anhydride proper, all of the above-listed types fall within the class substituted succinic or glutaric acid anhydrides. In place of the organic acid anhydrides mentioned above, one may also use the substituted dicarboxylic acid chlorides of those dicarboxylic acids which form cyclic anhydrides, such as, for example, alkenyl succinic acid chloride. Therefore, in this specification and the examples and claims, it is to be understood that whenever we speak of the organic acid anhydride, the substituted dicarboxylic acid chloride may be used as the equivalent thereof. In all cases, the remaining free carboxyl radical present after the reaction of the reagent with the polysaccharide represents the hydrophilic group.

The products formed by the reaction of polysaccharides with any of the above-listed reagents are the acid esters of the substituted dicarboxylic acids and, more specifically, they are the acid esters of either substituted succinic or glutaric acid. These acid esters may be represented by the following structural formula:

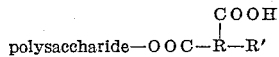

Wherein R is a dimethylene or trimethylene radical and R' is the substituent hydrophobic group (this being an alkyl, alkenyl, aralkyl, or aralkenyl group containing from 5 to 18 carbon atoms). The hydrophilic group in all cases is the remaining free carboxyl group (COOH) resulting from the esterification of only one carboxyl group of the dicarboxylic acid.

The esterification of the polysaccharide with the substituted cyclic organic acid anhydride may take place in one of the following ways (it being understood that although we refer to starch, for the sake of brevity, there is no intent thereby to exclude the other polysaccharides):

I. *Aqueous method.*—By this method the starch is treated, while in aqueous suspension, with the reagent.

In Patent No. 2,461,139, granted February 8, 1949, there is described a method for treating starch, in aqueous alkaline suspension, with an organic acid anhydride. Although that patent does not contemplate or disclose the use of a reagent which introduces a substituent containing within its structure both a hydrophilic and a hydrophobic group, the general procedure of that process may be followed in our present invention.

Thus, the pH of the suspension may be maintained on the alkaline side, preferably not lower than 7 nor higher than 11. This can be accomplished by adding enough of an alkaline medium, such as dilute sodium hydroxide or sodium carbonate solution, to the starch milk to raise the pH—for example, to 11—and then to add one of the reagents from the above-listed group—say, alkenyl succinic anhydride—until the pH is lowered to about 7. Alternate addition of alkali and anhydride reagent is continued in this manner until the desired amount of reagent has been added. Another method is to run the alkali and the anhydride reagent into the starch milk concurrently, regulating the rate of flow of each of these added materials so that the pH of the starch suspension remains preferably between 8 and 11. Still another method is to add concurrently the starch milk, alkali, and the anhydride reagent into a central vessel, with vigorous agitation. By still another variation, the entire calculated amount of a suitable alkali is added to the starch milk at the beginning of the process, followed by the addition of the entire quantity of reagent, without any subsequent additions of either alkali or reagent.

The reaction is preferably carried out at room temperature.

The proportion of reagent to be used varies with the degree of substitution desired in the final product. However, for the aqueous and dry methods, we ordinarily prefer to use quantities ranging from 0.1% to about 100%, based on the dry starch content, and when the final product is to be in the form of an ungelatinized starch derivative, a maximum of about 10% of the anhydride reagent is often sufficient.

This same procedure may be applied to starches which have been gelatinized and dispersed, as well as to starch degradation products such as thin boiling starches, British gums, and dextrins, which, depending on their solubility or pretreatment, may undergo the reaction in a state of suspension, dispersion, or solution. When the reaction is complete, the product, if ungelatinized, may be filtered, washed with water, and dried, in the usual manner. If the starch or starch derivative has been gelatinized and/or dispersed, the final product may be used in the form of its aqueous dispersion or it may be dried by passing over heated drums, by spray drying or by precipitation in alcohol or other organic solvent media with subsequent drying of the precipitate.

It should be pointed out that whenever we refer to alkali in this specification, the word is meant to include not only sodium hydroxide, but also other basic chemicals, including the hydroxides or basic salts of sodium, potassium, barium, lithium, as well as quaternary ammonium hydroxides, and other organic bases.

Although we have referred to the products of our invention as polysaccharide acid esters, it will be obvious that because of the alkaline conditions prevailing during the reaction, the final product is ordinarily actually produced in the form of the sodium or other salt of the acid ester. In other words, in the diagrammatic formula which we have shown for the polysaccharide acid ester, the carboxyl group COOH would ordinarily be present in the form of its salt. This holds true regardless of which reaction method is used. If it is undesirable to have the acid ester in the form of its salt, the final product may be washed with a dilute mineral acid in order that the salt of the carboxyl group may be changed to the normal carboxyl form COOH. Wherever, in the claims or specification, we refer to the polysaccharide acid ester, therefore, it will be understood that this term includes the salt of the acid ester.

II. *Dry method.*—We have also found that the treatment of the starch with a reagent to introduce a hydrophilic and hydrophobic group may be carried out with the starch in the commercially dry form. By "commercially dry" we mean a starch having a moisture content of approximately 5% to 20%. This is best done by blending the dry starch with an alkaline material such as trisodium phosphate or sodium carbonate and with the reagent (such as, for example, alkenyl succinic anhydride), and heating the mixture. Instead of blending the alkaline material with the dry starch, one may use a starch which has been pretreated by suspending it in water containing dissolved therein approximately 1% of sodium hydroxide or other strong base (calculated on the dry weight of the starch), followed by filtering without washing, and drying. This dry alkali-treated starch may then be reacted as above indicated, directly with the reagent. A specific illustration of this method will be found among the examples to be given at a later point in this specification.

III. *Organic suspension or dispersion method.*— In place of Method I, wherein water is the suspension or dispersion medium, the starch may be treated in an organic liquid such as benzol, which is chemically inert toward the starch and the reagent. Thus, the ungelatinized starch may be suspended in benzol, with the subsequent addition of the reagent together with sufficient pyridine (which is alkaline) to neutralize the reagent. The solvent may be removed, after the reaction, by distillation. By another variation, starch which has been pregelatinized and dried is dispersed in pyridine, and the reagent added. It is ordinarily found that when using the organic dispersion method, it is advisable to use somewhat larger quantities of the anhydride reagent.

The following examples will further illustrate the embodiment of our invention:

EXAMPLE I

This example illustrates the production of the starch acid ester of a substituted succinic acid wherein the decenyl group is the alkenyl hydrophobic substituent corresponding to R' in the structural formula and the free carboxyl radical is the hydrophilic group. In this, and in the other examples, all parts given are by weight.

Five (5) parts of sodium carbonate were dissolved in 150 parts of water. One hundred (100) parts of tapioca starch were suspended in this alkaline solution, with agitation, and this was followed by adding slowly 10 parts of decenyl succinic acid anhydride. Agitation was continued for 14 hours, at room temperature. The pH was then adjusted to 7.0, using dilute hydrochloric acid solution. The starch derivative was then filtered, washed with water, dried, and powdered.

The resulting product was a white powder resembling, in physical appearance, ordinary powdered starch. To illustrate its emulsifying power, 4 grams of the starch derivative were cooked in 46 ccs. of water for 15 minutes at 95° C. After cooling, 25 grams of turpentine were added by means of a high-speed agitator. The result was an emulsion with a 33⅓% of oil phase. The emulsion was very smooth, creamy white, with excellent stability. By contrast, when untreated tapioca starch was used as the emulsifying agent, under comparable conditions, the turpentine began to separate out immediately after agitation was stopped.

EXAMPLE II

This example illustrates the production of the starch acid ester of a substituted succinic acid wherein the octenyl group is the alkenyl hydrophobic substituent corresponding to R' in the structural formula and the free carboxyl radical is the hydrophilic group.

Two (2) parts of sodium carbonate were dissolved in 150 parts of water. To this solution was added, with agitation, 100 parts of a thin-boiling corn starch (known as 60 fluidity corn starch). This was followed by the addition of 0.1 part of octenyl succinic acid anhydride. Agitation was continued for 12 hours and, after adjusting the pH to approximately 7, the material was filtered, washed, and dried.

EXAMPLE III

This example illustrates the production of the cellulose acid ester of a substituted succinic acid wherein the nonenyl group is the alkenyl hydrophobic substituent corresponding to R' in the structural formula and the free carboxyl radical is the hydrophilic group.

In 12,000 parts of water there were dispersed 400 parts of a water-soluble methyl cellulose (distributed by General Dyestuff Corporation under the trade name "Colloresine DKHV"). To this dispersion was added a solution of 30 parts of sodium carbonate in 200 parts of water. Fifty (50) parts of nonenyl succinic acid anhydride were then added. Agitation was maintained for approximately 16 hours, whereupon the pH was adjusted to 6.5 by the addition of hydrochloric acid.

EXAMPLE IV

This example illustrates the production of the starch acid ester of a substituted succinic acid wherein the triisobutenyl radical is the alkenyl hydrophobic substituent corresponding to R' in the structural formula and the free carboxyl radical is the hydrophilic group.

Six (6.0) parts of sodium carbonate were dissolved in 150 parts of water, and 100 parts of a thin-boiling waxy maize starch (known in the trade as 85 fluidity waxy maize) was added thereto, with agitation. There were then added 10 parts of triisobutenyl succinic acid anhydride (dissolved in 40 parts of acetone). Agitation was continued for approximately 14 hours, followed by neutralization, filtration, washing, and drying. In this, as in the other examples, it was found that further purification could be achieved y washing the material, during the filtration step, not only with water but also with a water-miscible chemical which acts as a solvent for the reagent. Thus, in this case, the starch derivative was washed with ethyl alcohol, followed by washing with water.

EXAMPLE V

This example illustrates the production of the starch acid ester of a substituted succinic acid wherein the octadecenyl group is the alkenyl hydrophobic substituent corresponding to R' in the structural formula and the free carboxyl radical is the hydrophilic group.

One hundred (100) parts of a heavy-cooking tapioca British gum (having a solubility of 95-100%) were dispersed in 100 parts of water. The pH of the dispersion was raised to 9.0 by the addition of a 2% sodium hydroxide solution. Then there were added, slowly, with continuous agitation, 10 parts of octadecenyl succinic acid anhydride dissolved in acetone. The pH was maintained between 8 and 9 by further additions of dilute sodium hydroxide solution, as necessary. Agitation was continued for 10 hours, with the pH being maintained at the 8-9 level. Then the pH was adjusted to 6.5. It was found that the resulting dispersion could be used, without further treatment, as an emulsifying agent. In some cases, it was found preferable to cook the dispersion for several minutes prior to its use. Further purification could be achieved by pouring the dispersion into a water-miscible organic solvent such as ethyl alcohol or acetone, thereby precipitating the starch derivative, followed by washing and drying. In another variation, applicable to this as well as to the other examples, the dispersion or suspension of the starch derivative may be passed over revolving heated drums, resulting in a gelatinized, dried product.

EXAMPLE VI

This example illustrates the production of the starch acid ester of a substituted succinic acid wherein the octenyl group is the alkenyl hydrophobic substituent corresponding to R' in the structural formula and the free carboxyl radical is the hydrophilic group. As distinguished, however, from Example V, this example illustrates the use of the acid chloride reagent rather than the anhydride.

One hundred (100) parts of potato starch were suspended in 150 parts of water. The pH was raised to 9 by the addition of a 3% solution of sodium hydroxide. There were then added, slowly, with agitation, 10 parts of octenyl succinic acid chloride (maintaining the pH throughout within the range 7-10 by the addition, as necessary, of a 3% sodium hydroxide solution). Agitation was continued for 10 hours, maintaining the pH at approximately 8. At the end of this period, the pH was lowered to 7 by the addition of dilute hydrochloric acid and the starch derivative was filtered, washed with water, and dried.

EXAMPLE VII

This example illustrates the production of the starch acid ester of a substituted succinic acid wherein the octenyl group is the alkenyl hydrophobic substituent corresponding to R' in the structural formula and the free carboxyl radical is the hydrophilic group.

One hundred (100) parts of an acid converted, thin-boiling waxy maize starch (85 fluidity) were gelatinized by cooking in 100 parts of water. Upon cooling, the pH was brought to 9 by the addition of dilute sodium hydroxide solution. There were then added, slowly, with continuous agitation, 100 parts of octenyl succinic acid anhydride (maintaining the pH during this addition of reagent at 8 by the addition, as necessary, of sodium hydroxide solution). Agitation was continued for approximately 7 hours, after which the pH was adjusted to 7 by the addition of hydrochloric acid. The resulting heavy, grayish-white paste was found suitable for use as an emulsifying agent, without further treatment, although, if desired, it could, of course, be subjected to drying over heated drums or could be precipitated by mixing with a large excess of ethyl alcohol, acetone, or other known precipitants, followed by filtration and drying.

EXAMPLE VIII

This example illustrates the production of the starch acid ester of a substituted succinic acid wherein the methyl pentadiene addendum is the alkenyl hydrophobic substituent corresponding to R' in the structural formula and the free carboxyl radical is the hydrophilic group.

Eight (8) parts of sodium carbonate were dissolved in 150 parts of water. 100 parts of thin-boiling corn starch (60 fluidity corn starch) were suspended therein, and this was followed by the slow addition of 10 parts of a 60% solution of the adduct of maleic anhydride with methyl pentadiene in dioxane. Agitation was continued for about 16 hours, followed by neutralization and filtration. It was found advisable, in order to achieve further purification, to wash with dioxane during the filtration step, followed by washing with water and drying.

EXAMPLE IX

This example illustrates the production of the starch acid ester of a substituted succinic acid wherein the capryloxy radical is the alkyl hydrophobic substituent corresponding to R' in the structural formula and the free carboxyl radical is the hydrophilic group.

One hundred (100) parts of corn starch were suspended in 150 parts of water. The pH was adjusted to 10 by the addition of a 3% solution of sodium hydroxide. There were then added, slowly, 20 parts of capryloxy succinic acid anhydride (keeping the pH within the range of 7-10 by the addition, as necessary, of 3% sodium hydroxide solution). Agitation was continued for 10 hours, maintaining the pH at about 8. At the end of this period, the material was neutralized to pH 7 by the addition of dilute hydrochloric acid. The starch derivative was filtered, washed with water, and dried.

EXAMPLE X

This example illustrates the production of the starch acid ester of a substituted succinic acid wherein the octenyl group is the alkenyl hydrophobic substituent corresponding to R' in the structural formula and the free carboxyl radical is the hydrophilic group. This example also illustrates the dry reaction method.

Ten parts of octenyl succinic acid anhydride were thinned by mixing with sufficient toluene to produce a liquid suitable for spraying. This material was then sprayed into 100 parts of corn starch into which there had previously been blended 6 parts of powdered sodium carbonate. This mixture was agitated for 3 days, maintaining the temperature within the range 90–100° F. Sufficient heat was then applied to the starch derivative to drive off residual toluene.

By a variation of this method, 100 parts of corn starch were suspended in water in which had been dissolved 1 part of sodium hydroxide. The starch was then filtered and dried. Into this dry starch were then sprayed 10 parts of octenyl succinic acid anhydride, which had been thinned as indicated above. The mixture was agitated and heated to the same extent as shown above.

EXAMPLE XI

This example illustrates the production of the starch acid ester of a substituted succinic acid wherein the nonenyl group is the alkenyl hydrophobic substituent corresponding to R' in the structural formula and the free carboxyl radical is the hydrophilic group. This example also illustrates the organic dispersion method.

Twenty (20) parts of starch were gelatinized by cooking in water and then precipitated by pouring the starch dispersion into a large excess of ethanol. The gelatinized starch precipitate was then filtered and dried. This dried, gelatinized starch was then dispersed in 200 parts of pyridine, and 172 parts of nonenyl succinic acid anhydride were added. The mixture was heated at 100–120° C. for approximately 10 hours, then cooled, and poured into a large excess (approximately 3000 ml.) of ethanol. The resulting starch derivative precipitate was filtered, washed several times with ethyl alcohol to remove residual reagent, and dried. The white granular material resulting from this process is preferably prepared for use as an emulsifying agent by dispersing in a very dilute solution of sodium hydroxide or other alkali metal hydroxide, thus forming the alkali metal salt of the starch derivative.

EXAMPLE XII

This example illustrates the production of the cellulose acid ester of a substituted succinic acid wherein the octenyl group is the alkenyl hydrophobic substituent corresponding to R' in the structural formula and the free carboxyl radical is the hydrophilic group.

In 12,000 parts of water there were dispersed 400 parts of a water-soluble methyl cellulose (distributed by General Dyestuff Corporation under the trade name "Colloresine DKHV"). To this dispersion was added a solution of 30 parts of sodium carbonate in 200 parts of water. 50 parts of octenyl succinic acid anhydride were then added. Agitation was maintained for approximately 16 hours, whereupon the pH was adjusted to 6.5 by the addition of hydrochloric acid.

EXAMPLE XIII

This example illustrates the production of the starch acid ester of a substituted glutaric acid wherein the heptyl group is the alkyl hydrophobic substituent corresponding to R' in the structural formula and the free carboxyl radical is the hydrophilic group.

One thousand (1,000) parts of corn starch were suspended in 1,250 parts of water in which 80 parts of sodium carbonate had been dissolved. There were slowly added, with agitation, 100 parts of heptyl glutaric acid anhydride. Agitation was maintained for 18 hours, whereupon the pH was adjusted to 7.0, the starch product filtered, washed twice with water, and dried.

EXAMPLE XIV

This example illustrates the production of the starch acid ester of a substituted succinic acid wherein the benzyloxy radical is the aralkyl hydrophobic substituent corresponding to R' in the structural formula and the free carboxyl radical is the hydrophilic group.

One thousand (1,000) parts of corn starch were suspended in 1,250 parts of water in which 80 parts of sodium carbonate had been dissolved. There were slowly added, with agitation, 100 parts of benzyloxy succinic acid anhydride. After approximately 12 hours of agitation, the product was neutralized, filtered, washed, and dried.

The products of our invention, if permitted to undergo the reaction in their ungelatinized state, may be made ready for use as emulsifying agents by cooking in water to form a dispersion. If the products are produced in the form of a dispersion or solution, they may be used, if desired, without further treatment. Various methods of purification have already been indicated. The polysaccharide derivatives of our invention may be subjected to any of the physical and chemical reactions known to be applicable to polysaccharides, such as treatment upon heated drums, dextrinization, as well as treatment with chemicals. One such chemical treatment, for example, involves the reaction of the starch derivative of this present invention with certain organic acid anhydrides, such as maleic acid anhydride (as described in U. S. Patent No. 2,461,139 of February 8, 1949), followed by the subsequent treatment with a reagent such as a bisulfite, to introduce sulfonic acid groups (as described in copending application Serial No. 756,106, filed June 20, 1947).

As already stated, the products of our invention have excellent properties as emulsifying agents, and specific use of this property will be apparent to those familiar with the art. Furthermore, our products are valuable as thickeners. Frequently, it is desirable to employ combination thickeners-emulsifiers, as, for example, in the manufacture of cold creams, resin emulsions, emulsion type paints, cleaning compounds, and the like.

Emulsion type paints ordinarily consist of emulsions of oils, resins, and/or lacquers in water. Since these products are ordinarily incompatible with water, it is necessary to use an emulsifying agent which will effectively stabilize the emulsion. Furthermore, consistency is an important factor in paints since either too great or too little flow can seriously interfere with the utility of the paint. Therefore, is is necessary to employ thickening agents. The polysaccharide product of our invention combines these properties of thickener and emulsifier and is, therefore, of particular value for this application.

Cold creams and similar cosmetic preparations are ordinarily based upon oil and water emulsions, and viscosity is an important factor, the products ranging from flowable materials to salves and heavy pastes. Here, too, the polysaccharide derivative of our invention acts as a combination emulsifier-thickener.

Many liquid cleaning compounds consist of an emulsion of water (to remove water-soluble stains) and organic solvents (to handle greases and similar organic solvent-soluble materials). The product of our invention is not only an effective emulsifying agent for such compounds, but is advantageous in obtaining the proper thickening effect so that the final material will have the desired body and consistency. This same combination of thickening and emulsifying properties has caused our product to find important uses in the thickening and stabilizing of latices.

Another characteristic of industrial importance lies in the fact that when the products of our invention are employed as textile and paper sizes, paper coatings, and the like, they produce films which are substantially water-repellent. Because of the presence of hydrophobic groups, they are considerably less easily wetted by water than the corresponding untreated polysaccharides.

Our invention results in the production of valuable laundry starches, and it has been found possible to iron fabrics containing such starches more easily and with less sticking, presumably because the fatty acid hydrophobic groups in the polysaccharide have a detackifying, lubricating effect. The water-repellent properties of such laundry starches is also of obvious value, it having been found, for example, that shirt collars, on which such starch has been used, show less tendency toward wilting.

From the description herein given of the properties of our product, further industrial uses will be apparent.

We claim:

1. A substituted polysaccharide derivative in the form of a water-dispersible material, characterized by each substituent radical containing both a hydrophilic group and a hydrophobic group, having the following formula:

$$\text{polysaccharide} - \text{OOC} - \underset{|}{\text{R}} - \text{R}'$$
$$\phantom{\text{polysaccharide} - \text{OOC} - }\text{COOH}$$

wherein R is a radical from the class of dimethylene and trimethylene radicals and R' is the substituent hydrophobic group from the class consisting of an alkyl, alkenyl, aralkyl and aralkenyl group containing from 5 to 18 carbon atoms, and wherein the carboxyl radical COOH is the hydrophilic group.

2. The substituted polysaccharide derivative of claim 1 wherein the polysaccharide is starch.

3. The substituted polysaccharide derivative of claim 1 wherein the polysaccharide is cellulose.

CARLYLE G. CALDWELL.
OTTO B. WURZBURG.

References Cited in the file of this patent

UNITED STATES PATENTS

| Number | Name | Date |
|---|---|---|
| 2,146,755 | McNally et al. | Feb. 14, 1939 |
| 2,225,589 | Haussman et al. | Dec. 17, 1940 |
| 2,461,139 | Caldwell | Feb. 8, 1949 |